(12) United States Patent
Koeniger et al.

(10) Patent No.: US 7,879,963 B2
(45) Date of Patent: Feb. 1, 2011

(54) COMPOSITION, ARTICLE, AND ASSOCIATED METHOD

(75) Inventors: Rainer Koeniger, Clifton Park, NY (US); Chad M. Denton, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 526 days.

(21) Appl. No.: 11/958,604

(22) Filed: Dec. 18, 2007

(65) Prior Publication Data

US 2009/0156765 A1 Jun. 18, 2009

(51) Int. Cl.
 *C08K 9/00* (2006.01)
 *C08F 220/08* (2006.01)
 *C08F 4/80* (2006.01)

(52) U.S. Cl. ............... 526/272; 526/171; 526/271; 524/853; 523/200; 523/212; 523/214; 428/364; 428/402

(58) Field of Classification Search ......... 526/171, 526/271, 272; 523/212, 200, 214; 524/853; 428/364, 402
See application file for complete search history.

(56) References Cited

U.S. PATENT DOCUMENTS

| | | | |
|---|---|---|---|
| 4,028,482 A * | 6/1977 | Ueshima et al. ......... 526/271 |
| 5,055,499 A | 10/1991 | Endo et al. |
| 5,063,103 A | 11/1991 | Sugawara et al. |
| 5,096,644 A | 3/1992 | Endo et al. |
| 5,728,785 A | 3/1998 | Grubbs et al. |
| 5,840,238 A | 11/1998 | Setiabudi et al. |
| 5,939,504 A | 8/1999 | Woodson, Jr. et al. |
| 6,001,488 A | 12/1999 | Kataoka et al. |
| 6,001,909 A | 12/1999 | Setiabudi |
| 6,040,363 A | 3/2000 | Warner et al. |
| 6,323,296 B1 | 11/2001 | Warner et al. |
| 6,379,799 B1 | 4/2002 | Almen |
| 6,409,875 B1 | 6/2002 | Giardello et al. |
| 6,423,780 B1 | 7/2002 | Dershem et al. |
| 6,436,476 B1 | 8/2002 | Sage, Jr. |
| 6,750,272 B2 | 6/2004 | Kessler et al. |
| 6,890,650 B2 | 5/2005 | Hedden |
| 6,946,523 B2 | 9/2005 | Dershem et al. |
| 7,022,790 B2 | 4/2006 | Elce et al. |
| 7,267,887 B2 | 9/2007 | Kitahara et al. |
| 7,339,006 B2 | 3/2008 | Giardello et al. |
| 2002/0099168 A1 | 7/2002 | Dershem et al. |
| 2004/0242836 A1 | 12/2004 | Hayes et al. |
| 2006/0154099 A1 | 7/2006 | Kodemura et al. |
| 2007/0073079 A1 | 3/2007 | Liaw et al. |

FOREIGN PATENT DOCUMENTS

| | | |
|---|---|---|
| EP | 0181640 B1 | 8/1989 |
| EP | 0936231 B1 | 9/2003 |
| EP | 0931816 B1 | 4/2005 |
| EP | 1320566 B1 | 12/2005 |
| WO | 2006023511 A1 | 3/2006 |

OTHER PUBLICATIONS

Jordi et al, "Quantitative Determination of the Chemical Compositon of Silica-Poly(norbornene) Nanocomposites," J. Am. Chem. Soc. 2005, 127, 4416-4422.*
M.R Kessler et al.; Self-healing structural composite materials; Composites: Part A 34 (2003) 743-753; 11 Pages; Retrieved from- http://www.autonomic.uiuc.edu/files/publications_papers/2003_Kessler_Composites.pdf.
Alan S Jones et al; Catalyst Morphology and Dissolution Kinetics of Self-Healing Polymers; Chem. Mater. 2006, 18, 1312-1317; 6 Pages; Retrieved from- http://www.autonomic.uiuc.edu/files/publications_papers/2006_Jones_Catalyst_Morphology.pdf.

* cited by examiner

*Primary Examiner*—Fred M Teskin
(74) *Attorney, Agent, or Firm*—Joseph J. Christian

(57) ABSTRACT

A composition includes a coupling agent composition and a polymer precursor. The coupling agent includes a first cycloolefin substituted with at least one anhydride group and the coupling agent is capable of bonding to a filler having a corresponding binding site. The polymer precursor includes a second cycloolefin. An associated article and a method are also provided.

21 Claims, 1 Drawing Sheet

COMPOSITION, ARTICLE, AND ASSOCIATED METHOD

BACKGROUND

1. Technical Field

Figure 1:
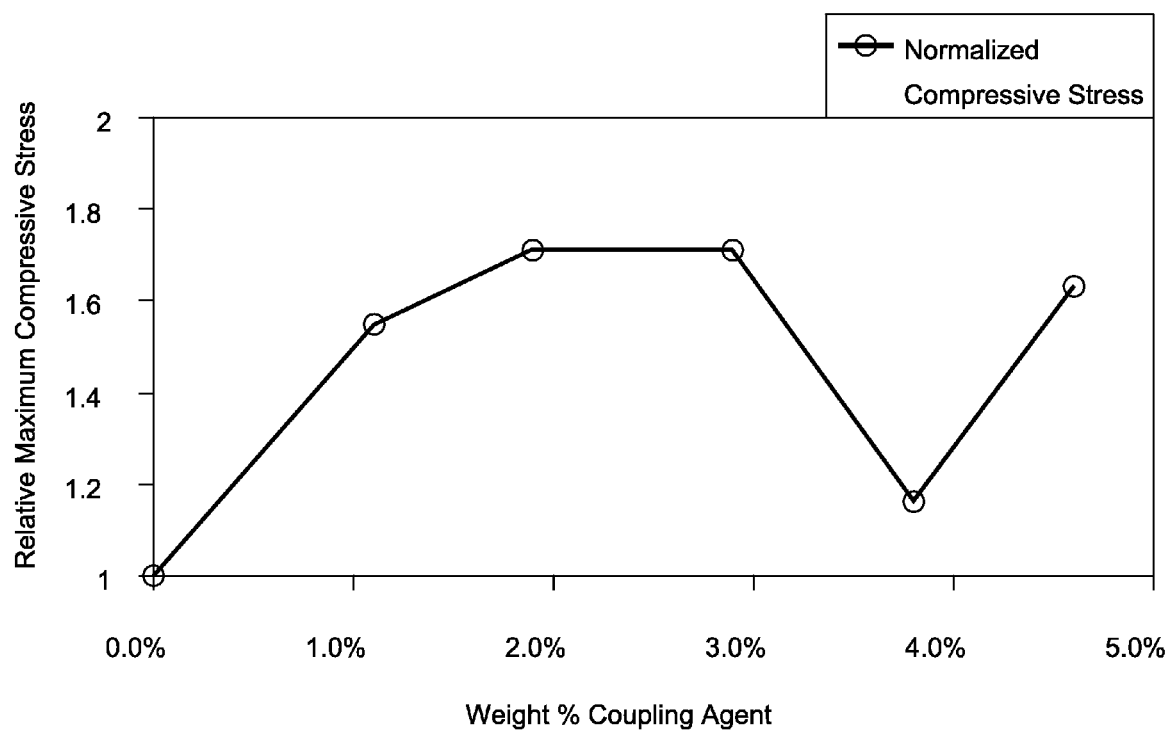

The invention includes embodiments that relate to a cycloolefin-based curable composition including a coupling agent. The invention includes embodiments that relate to a method of making and using the cycloolefin-based composition.

2. Discussion of Related Art

Metathesis polymerization reactions (for example, ring opening metathesis polymerization of cycloolefins) may provide for synthesis of polycycloolefins by controlled polymerization reaction. Polymers synthesized by ring opening metathesis polymerization may be reinforced with reinforcing materials (for example, fibers) to provide composites for high performance applications.

Performance properties of the composites may be affected by fiber loading, adhesion between the fibers and the polymer, polymer properties, and the like. Poor adhesion between the fibers and the polymer may affect the performance characteristics of the composites. Adhesion between the fibers and the polymer may be enhanced by employing coupling agents, sizing agents for the fibers, or both coupling agents and sizing agents. Coupling agents or sizing agents may adversely affect the catalytic efficiency of metathesis catalysts employed in ring opening metathesis polymerizations.

It may be desirable to have cycloolefin-based compositions and methods of making the cycloolefin-based compositions that have characteristics that are different from those currently available. It may be desirable to have composites and methods of making the composites that have characteristics that are different from those currently available.

BRIEF DESCRIPTION

In one embodiment, a composition is provided that includes a coupling agent composition and a polymer precursor. The coupling agent includes a first cycloolefin substituted with at least one anhydride group and the coupling agent is capable of bonding to a filler having a corresponding binding site. The polymer precursor includes a second cycloolefin.

In one embodiment, a composition is provided that includes a coupling agent composition and polymer precursor. The coupling agent includes a first cycloolefin substituted with at least one anhydride group and the coupling agent is capable of bonding to a filler having a corresponding binding site. The polymer precursor includes a monofunctional cycloolefin, a polyfunctional cycloolefin, or both a monofunctional cycloolefin and a polyfunctional cycloolefin.

In one embodiment, an article is provided that includes a reaction product of a coupling agent composition, a polymer precursor, a metathesis catalyst, and a filler having binding sites. The coupling agent includes a first cycloolefin substituted with at least one anhydride group and the polymer precursor includes a second cycloolefin. The metathesis catalyst is capable of catalyzing a ring-opening metathesis polymerization reaction when contacted to the first cycloolefin or the second cycloolefin.

In one embodiment, a method is provided that includes contacting a coupling agent composition with a polymer precursor to form a curable composition. The method includes contacting the curable composition with a filler having binding sites to which the coupling agent composition can bond. The coupling agent composition includes a first cycloolefin substituted with at least one anhydride group and the polymer precursor includes a second cycloolefin.

BRIEF DESCRIPTION OF DRAWING FIGURES

FIG. 1 shows the effect of coupling agent concentration on compression strength of composite resin plaques.

DETAILED DESCRIPTION

The invention includes embodiments that relate to a cycloolefin-based curable composition including a coupling agent. The invention includes embodiments that relate to a method of making and using the cycloolefin-based composition.

In one embodiment, a composition is provided that includes a coupling agent composition having a first cycloolefin substituted with at least one anhydride group. The composition includes a polymer precursor having a second cycloolefin. The coupling agent composition is capable of bonding to a filler having a corresponding binding site. As used herein, the term "coupling agent" refers to a material that may provide for an improved interface or adhesion between the filler and a polymeric material. In one embodiment, a polymeric material may include a reaction product of a ring opening metathesis polymerization reaction of a cycloolefin.

A "cycloolefin" refers to an organic molecule having as a moiety at least one non-aromatic cyclic ring, and in which the non-aromatic ring has at least one carbon-carbon double bond, and of those carbon-carbon double bonds at least one is a metathesis-active double bond. A metathesis-active double bond includes a bond that is capable of undergoing a metathesis reaction in the presence of a metathesis catalyst. A metathesis reaction of an olefin refers to a chemical reaction involving redistribution of alkene bonds. In one embodiment, a metathesis-active double bond in the cycloolefin is capable of undergoing a ring-opening metathesis polymerization reaction in the presence of a metathesis catalyst.

A cycloolefin may be strained or unstrained. In one embodiment, a cycloolefin may include two or more carbon-carbon double bonds, for example, dienes. In one embodiment, a cycloolefin may include one or more of cyclooctadiene, cyclooctene, cyclotetraene, cyclodecene, cyclododecene, or a derivative thereof. In one embodiment, a cycloolefin may include a strained cyclic structure (for example, norbornene). In one embodiment, a cycloolefin may include one or more heteroatoms (for example, oxanorbornene). In one embodiment, a cycloolefin may include at least two carbon-carbon double bonds (for example, norbornadiene). In one embodiment, a cycloolefin may include two or more cyclic rings that may be fused with each other (for example, dicyclopentadiene).

Within the group of cycloolefins, a "first cycloolefin" refers to those cycloolefin molecules that are further substituted with at least one anhydride group (or —CO—O—OC— group). In one embodiment, a first cycloolefin may be substituted with an anhydride group that is internal to the ring structure of the cycloolefin. In one embodiment, a first cycloolefin may include a structure having a formula (I):

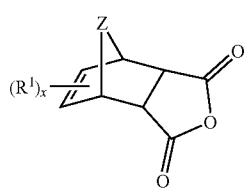

(I)

wherein "x" is 0, 1, or 2;

$R^1$ is independently at each occurrence a halogen atom, an aliphatic radical, a cycloaliphatic radical, an aromatic radical, an alkoxy group, a hydroxy group, an ether group, an aldehyde group, an ester group, a ketone group, a thiol group, a disulfide group, an amine group, an amide group, a quaternary amine group, an imine group, an isocyanate group, a carboxyl group, a silanyl group, a phosphanyl group, a sulfate group, a sulfonate group, a nitro group, or a divalent bond linking two carbon atoms; and Z is $C(R^5)_2$, $C=C(R^5)_2$, $Si(R^5)_2$, O, S, N—$R^5$, P—$R^5$, B—$R^5$, or As—$R^5$, wherein $R^5$ is independently at each occurrence hydrogen, an aliphatic radical, a cycloaliphatic radical, or an aromatic radical.

In an alternate embodiment, a first cycloolefin may be substituted with an anhydride group that is pendant or external to the ring structure of the cycloolefin. In one embodiment, a first cycloolefin may include a structure having a formula (II) or (III):

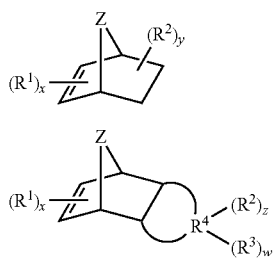

(II)

(III)

wherein "w" is 0, 1, 2 or 3, "x" is 0, 1, or 2, "y" is 1 or 2; "z" is 1, 2, 3, or 4;

$R^2$ includes at least one anhydride group;

$R^4$ is an aliphatic cyclic ring, a heterocycle, or an aromatic group;

$R^3$ is independently at each occurrence a halogen atom, an aliphatic radical, a cycloaliphatic radical, an aromatic radical, an alkoxy group, a hydroxy group, an ether group, an aldehyde group, a ketone group, a silanyl group, a phosphanyl group, a nitro group, or a divalent bond linking two carbon atoms; and $R^1$ and Z are as defined herein. Aliphatic radical, cycloaliphatic radical, and aromatic radical may be defined as the following:

Aliphatic radical is an organic radical having at least one carbon atom, a valence of at least one and may be a linear or branched array of atoms. Aliphatic radicals may include heteroatoms such as nitrogen, sulfur, silicon, selenium and oxygen or may be composed exclusively of carbon and hydrogen. Aliphatic radical may include a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example, carboxylic acid derivatives such as esters and amides), amine groups, nitro groups and the like. For example, the 4-methylpent-1-yl radical is a $C_6$ aliphatic radical comprising a methyl group, the methyl group being a functional group, which is an alkyl group. Similarly, the 4-nitrobut-1-yl group is a $C_4$ aliphatic radical comprising a nitro group, the nitro group being a functional group. An aliphatic radical may be a haloalkyl group that includes one or more halogen atoms, which may be the same or different. Halogen atoms include, for example; fluorine, chlorine, bromine, and iodine. Aliphatic radicals having one or more halogen atoms include the alkyl halides: trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (—$CONH_2$), carbonyl, dicyanoisopropylidene —$CH_2C(CN)_2CH_2$—), methyl (—$CH_3$), methylene (—$CH_2$—), ethyl, ethylene, formyl (—CHO), hexyl, hexamethylene, hydroxymethyl (—$CH_2OH$), mercaptomethyl (—$CH_2SH$), methylthio (—$SCH_3$), methylthiomethyl (—$CH_2SCH_3$), methoxy, methoxycarbonyl ($CH_3OCO$—), nitromethyl (—$CH_2NO_2$), thiocarbonyl, trimethylsilyl (($CH_3)_3Si$—), t-butyldimethylsilyl, trimethoxysilylpropyl (($CH_3O)_3SiCH_2CH_2CH_2$—), vinyl, vinylidene, and the like. By way of further example, a "$C_1$-$C_{30}$ aliphatic radical" contains at least one but no more than 30 carbon atoms. A methyl group ($CH_3$—) is an example of a $C_1$ aliphatic radical. A decyl group ($CH_3(CH_2)_9$—) is an example of a $C_{10}$ aliphatic radical.

A cycloaliphatic radical is a radical having a valence of at least one, and having an array of atoms, which is cyclic but which is not aromatic. A cycloaliphatic radical may include one or more non-cyclic components. For example, a cyclohexylmethyl group ($C_6H_{11}CH_2$—) is a cycloaliphatic radical, which includes a cyclohexyl ring (the array of atoms, which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. A cycloaliphatic radical may include one or more functional groups, such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical is a $C_6$ cycloaliphatic radical comprising a methyl group, the methyl group being a functional group, which is an alkyl group. Similarly, the 2-nitrocyclobut-1-yl radical is a $C_4$ cycloaliphatic radical comprising a nitro group, the nitro group being a functional group. A cycloaliphatic radical may include one or more halogen atoms, which may be the same or different. Halogen atoms include, for example, fluorine, chlorine, bromine, and iodine. Cycloaliphatic radicals having one or more halogen atoms include 2-trifluoromethylcyclohex-1-yl; 4-bromodifluoromethylcyclooct-1-yl; 2-chlorodifluoromethylcyclohex-1-yl; hexafluoroisopropylidene 2,2-bis(cyclohex-4-yl) (—$C_6H_{10}C(CF_3)_2C_6H_{10}$—); 2-chloromethylcyclohex-1-yl; 3-difluoromethylenecyclohex-1-yl; 4-trichloromethylcyclohex-1-yloxy; 4-bromodichloromethylcyclohex-1-ylthio; 2-bromoethylcyclopent-1-yl; 2-bromopropylcyclohex-1-yloxy (e.g. $CH_3CHBrCH_2C_6H_{10}$—); and the like. Further examples of cycloaliphatic radicals include 4-allyloxy cyclohex-1-yl; 4-amino cyclohex-1-yl ($H_2C_6H_{10}$—); 4-amino carbonyl cyclopent-1-yl ($NH_2COC_5H_8$—); 4-acetyloxy cyclohex-1-yl; 2,2-dicyano isopropylidene bis(cyclohex-4-yloxy) (—$OC_6H_{10}C(CN)_2C_6H_{10}O$—); 3-methyl cyclohex-1-yl; methylenebis(cyclohex-4-yloxy) (—$OC_6H_{10}CH_2C_6H_{10}O$—); 1-ethyl cyclobut-1-yl; cyclopropylethenyl; 3-formyl-2-terahydro furanyl; 2-hexyl-5-tetrahydro furanyl; hexamethylene-1,6-bis(cyclohex-4-yloxy) (—$OC_6H_{10}(CH_2)_6C_6H_{10}O$—); 4-hydroxy methyl cyclohex-1-yl (4-$HOCH_2C_6H_{10}$—); 4-mercaptomethylcyclohex-1-yl (4-$HSCH_2C_6H_{10}$—); 4-methyl thio cyclohex-1-yl (4-$CH_3SC_6H_{10}O$—); 4-methoxy cyclohex-1-yl; 2-methoxy carbonyl cyclohex-1-yloxy (2-$CH_3OCOC_6H_{10}O$—); 4-nitro methyl cyclohex-1-yl ($NO_2CH_2C_6H_{10}$—); 3-trimethyl silyl cyclohex-1-yl; 2-t-butyl dimethyl silyl cyclopent-1-yl; 4-trimethoxy silyl ethyl cyclohex-1-yl (e.g. ($CH_3O)_3SiCH_2CH_2C_6H_{10}$—); 4-vinyl cyclohexen-1-yl; vinylidene bis(cyclohexyl); and the like. The term "a $C_3$-$C_{30}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

An aromatic radical is an array of atoms having a valence of at least one and having at least one aromatic group. This may include heteroatoms such as nitrogen, sulfur, selenium, silicon and oxygen, or may be composed exclusively of carbon and hydrogen. Suitable aromatic radicals may include phenyl, pyridyl, furanyl, thienyl, naphthyl, phenylene, and biphenyl radicals. The aromatic group may be a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical also may include non-aromatic components. For example, a benzyl group may be an aromatic radical, which includes a phenyl ring (the aromatic group) and a methylene group (the non-aromatic component). Similarly a tetrahydronaphthyl radical is an aromatic radical comprising an aromatic group ($C_6H_3$) fused to a non-aromatic component —$(CH_2)_4$—. An aromatic radical may include one or more functional groups, such as alkyl groups, alkenyl groups, alkynyl groups, haloalkyl groups, haloaromatic groups, conjugated dienyl groups, alcohol groups, ether groups, thio groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group, which is an alkyl group. Similarly, the 2-nitrophenyl group is a C6 aromatic radical comprising a nitro group, the nitro group being a functional group. Aromatic radicals include halogenated aromatic radicals such as trifluoromethylphenyl; hexafluoro isopropylidene bis(4-phen-1-yloxy) (—OPhC($CF_3$)$_2$PhO—); chloromethyl phenyl; 3-trifluorovinyl-2-thienyl; 3-trichloro methylphen-1-yl (3-CCl$_3$Ph-); 4-(3-bromoprop-1-yl)phen-1-yl (BrCH$_2$CH$_2$CH$_2$Ph-); and the like. Further examples of aromatic radicals include 4-allyloxyphen-1-oxy; 4-aminophen-1-yl (H$_2$NPh-); 3-aminocarbonylphen-1-yl (NH$_2$COPh-); 4-benzoylphen-1-yl; dicyano isopropylidene bis(4-phen-1-yloxy) (—OPhC(CN)$_2$PhO—); 3-methylphen-1-yl; methylene bis(phen-4-yloxy) (—OPhCH$_2$PhO—); 2-ethylphen-1-yl; phenylethenyl; 3-formyl-2-thienyl; 2-hexyl-5-furanyl; hexamethylene-1,6-bis(phen-4-yloxy) (—OPh(CH$_2$)$_6$PhO—); 4-hydroxymethylphen-1-yl (4-HOCH$_2$Ph-); 4-mercaptomethylphen-1-yl (4-HSCH$_2$Ph-); 4-thiophenyl (—S-Ph); 4-methylthiophen-1-yl (4-CH$_3$SPh-); 3-methoxyphen-1-yl; 2-methoxycarbonylphen-1-yloxy (e.g., methyl salicyl); 2-nitromethylphen-1-yl (-PhCH$_2$NO$_2$); 3-trimethylsilylphen-1-yl; 4-t-butyldimethylsilylphenl-1-yl; 4-vinylphen-1-yl; vinylidenebis(phenyl); and the like. The term "a $C_3$-$C_{30}$ aromatic radical" includes aromatic radicals containing at least three but no more than 30 carbon atoms. The aromatic radical 1-imidazolyl ($C_3H_2N_2$—) represents a $C_3$ aromatic radical. The benzyl radical ($C_7H_7$—) represents a $C_7$ aromatic radical.

In one embodiment, $R^3$ may include a structure having a formula (IV):

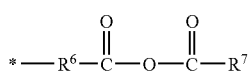

(IV)

wherein $R^6$ is a divalent group including an aliphatic radical, an aromatic radical, or a cycloaliphatic radical; and $R^7$ is an aliphatic radical, an aromatic radical, or a cycloaliphatic radical. In one embodiment, $R^6$ and $R^7$ are independently an aliphatic radical.

In one embodiment, a first cycloolefin may include a structure having a formula (V) to (XVIII)

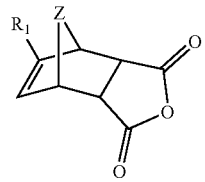
(V)

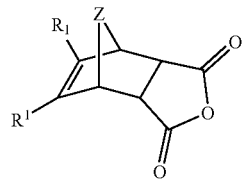
(VI)

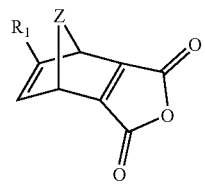
(VII)

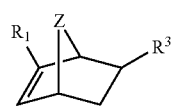
(VIII)

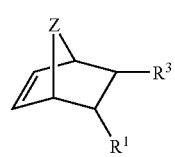
(IX)

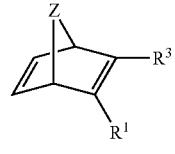
(X)

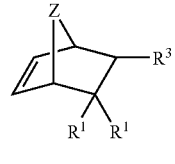
(XI)

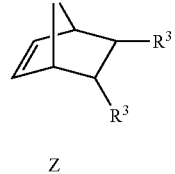
(XII)

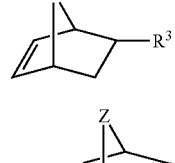
(XIII)

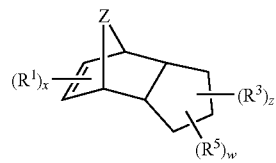
(XIV)

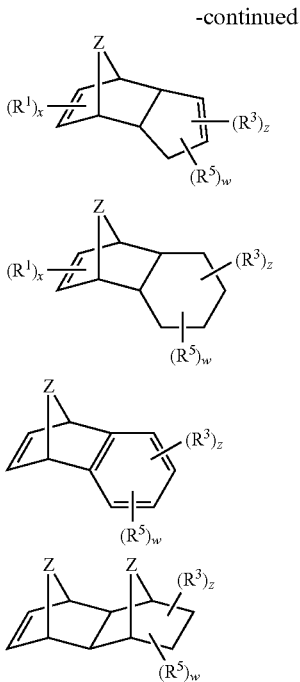

wherein "x", "w", "z", $R^1$, $R^3$, $R^5$, and Z are as defined herein.

The composition according to an embodiment of the invention may include a coupling agent composition as described hereinabove mixed with a polymer precursor. A polymer precursor may include monomeric species, oligomeric species, mixtures of monomeric species, mixtures of oligomeric species, polymeric species, mixtures of polymeric species, partially-crosslinked species, mixtures of partially-crosslinked species, or mixtures of two or more of the foregoing. In one embodiment, a polymer precursor may include a second cycloolefin, wherein cycloolefin is as defined hereinabove. The cycloolefin of the polymer precursor may ring open polymerize when contacted to a metathesis catalyst. In one embodiment, a second cycloolefin may copolymerize with the first cycloolefin when contacted to a metathesis catalyst.

A suitable polymer precursor cycloolefin may include one or more functional groups either as substituents of the second cycloolefin or incorporated into the carbon chain of the second cycloolefin. Suitable functional groups may include one or more of alcohol, thiol, ketone, aldehyde, ester, disulfide, carbonate, imine, carboxyl, amine, amide, nitro acid, carboxylic acid, isocyanate, carbodiimide, ether, halogen, quaternary amine, phosphate, sulfate or sulfonate. In one embodiment, a second cycloolefin may be free of anhydride group substituents.

In one embodiment, a second cycloolefin may be a monofunctional cycloolefin. A monofunctional cycloolefin as used herein refers to a cycloolefin having a single metathesis-active double bond. In one embodiment, a second cycloolefin may include a structure having a formula (XIX):

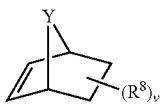

(XIX)

wherein "v" is 1, 2, 3, 4, 5, or 6;

$R^8$ is independently at each occurrence a halogen atom, an aliphatic radical, a cycloaliphatic radical, an aromatic radical, an alkoxy group, a hydroxy group, an ether group, an aldehyde group, an ester group, a ketone group, a thiol group, a disulfide group, an amine group, an amide group, a quaternary amine group, an imine group, an isocyanate group, a carboxyl group, a silanyl group, a phosphanyl group, a sulfate group, a sulfonate group, a nitro group, or two or more $R^8$ together form a cycloaliphatic radical, an aromatic radical, an imide group, a cycloolefin group, or a divalent bond linking two carbon atoms; and Y is $C(R^9)_2$, $C=C(R^9)_2$, $Si(R^9)_2$, O, S, $NR^9$, $PR^9$, $BR^9$, or $AsR^9$, wherein $R^9$ is independently at each occurrence hydrogen, an aliphatic radical, a cycloaliphatic radical, or an aromatic radical.

In an alternate embodiment, a second cycloolefin may be a polyfunctional cycloolefin. A "polyfunctional cycloolefin" refers to those cycloolefin molecules that further have two or more metathesis-active double bonds. In one embodiment, a polyfunctional cycloolefin may include a structure having a formula (XX):

$$(Z)_n D \qquad (XX)$$

wherein "n" is 2, 3, 4, 5, 6, 7, or 8;

D is a n-valent aliphatic, cycloaliphatic, or an aromatic bridging group; and

Z includes at least one cycloolefin group. A cycloolefin is as described hereinabove. In one embodiment, Z may include a cyclopentene radical, a cycloheptene radical, a cyclooctene radical, a cyclopentadiene radical, or a norbornene radical.

In one embodiment, a polyfunctional cycloolefin may include a structure having a formula (XXI):

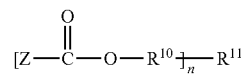

(XXI)

wherein "n" is 2, 3, 4, 5, 6, 7, or 8;

$R^{10}$ is an aliphatic radical, a cycloaliphatic radical, or an aromatic radical;

$R^{11}$ is a n-valent aliphatic radical a cycloaliphatic radical, or an aromatic radical; and Z includes at least one cycloolefin group.

In one embodiment, a cycloolefin may include one or more of norbornene; dicyclopentadiene; di(methyl)dicyclopentadiene; dihydrodicyclopentadiene; cyclopentadiene trimer; cyclopentadiene tetramer; tetracyclododecene; ethylidenenorborniene; methyltetracyclododecene; methylnorborinene; ethylnorbornene; dimethylnorbornene; norbornadiene; cyclopentene; cycloheptene; cyclooctene; 7-oxanorbornene; 7-oxabicyclo(2.2.1)hept-5-ene derivatives; 7-oxanorbornadiene; cyclododecene; 2-norbornene (also named bicyclo(2.2.1)-2-heptene); 5-methyl-2-norbornene; 5,6-dimethyl-2-norbornene; 5-ethyl-2-norbornene; 5-butyl-2-norbornene; 5-hexyl-2-norbornene; 5-dodecyl-2-norbornene; 5-isobutyl-2-norbornene; 5-octadecyl-2-norbornene; 5-isopropyl-2-norbornene; 5-phenyl-2-norbornene; 5-p-toluoyl-2-norbornene; 5-a-naphthyl-2-norbornene; 5-cyclohexyl-2-norbornene; 5,5-dimethyl-2-norbornene; dicyclopentadiene (or cyclopentadiene dimer); dihydrodicyclopentadiene (or cyclopentene cyclopentadiene codimer); methyl-cyclopentadiene dimer; ethyl cyclopentadiene dimer; tetracyclododecene (also named 1,2,3,4,4a,5,8,8a-octahydro-1,4:5,8-dimethyanonaphthalene); 9-methyl-tetracyclo $(6.2.1.1^{3,6}.0^{2,7})$-4-dodecene (also named 1,2,3,4,4a,5,8,8a-octahydro-2-methyl-4,4:5,8-dimethanonaphthalene);

9-ethyl tetracyclo(6.2.1.1$^{3,6}$.0$^{2,7}$)-4-dodecene; 9-propyl-tetracyclo(6.2.1.1$^{3,6}$.0$^{2,7}$)-4-dodecene; 9-hexyl tetracyclo (6.2.1.1$^{3,6}$.0$^{2,7}$)-4-dodecene; 9-decyl tetracyclo(6.2.1.1$^{3,6}$.0$^{2,7}$)-4-dodecene; 9,10-dimethyl tetracyclo(6.2.1.1$^{3,6}$.0$^{2,7}$)-4-dodecene; 9-ethlyl-10-methyl tetracyclo(6.2.1.1$^{3,6}$.0$^{2,7}$)-4-dodecene; 9-cyclohexyl tetracyclo(6.2.1.1$^{3,6}$.0$^{2,7}$)-4-dodecene; 9-chloro tetracyclo(6.2.1.1$^{3,6}$.0$^{2,7}$)-4-dodecene; 9-bromo tetracyclo(6.2.1.1$^{3,6}$.0$^{2,7}$)-4-dodecene; cyclopentadiene-trimer; methyl-cyclopentadiene-trimer; or derivatives of the foregoing. The polymer precursor cycloolefin may include one or more functional groups either as substituents of the cycloolefin or incorporated into the carbon chain of the cycloolefin. In one embodiment, a second cycloolefin may consist essentially of dicyclopentadiene. In one embodiment, a second cycloolefin may consist essentially of dicyclopentadiene in combination with a polyfunctional cycloolefin.

The polymer precursor may include two or more of the aforementioned cycloolefins. In one embodiment, the polymer precursor may include mixtures of cycloolefins chosen to provide the desired end-use properties. In one embodiment, one or more functional properties of a polymeric material produced using the mixtures of cycloolefins may be determined by the type of functional groups present and the number of functional groups present.

At one stage of processing, the composition according to an embodiment of the invention may include a metathesis catalyst. The metathesis catalyst can catalyze a ring-opening metathesis polymerization reaction when contacted to the first cycloolefin or the second cycloolefin. A suitable metathesis catalyst may include a structure having a formula (XXII):

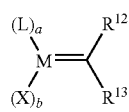

(XXII)

wherein "a" and "b" are independently integers from 1 to 3, with the proviso that "a+b" is less than or equal to 5;

M is ruthenium or osmium;

X is independently at each occurrence an anionic ligand;

L is independently at each occurrence a neutral electron donor ligand;

R$^{12}$ is hydrogen, an aliphatic radical, a cycloaliphatic radical, or an aromatic radical; and R$^{13}$ is an aliphatic radical, a cycloaliphatic radical, an aromatic radical, or S—R$^{12}$; or two or more of X, L, R$^{12}$ and R$^{13}$ independently form a cyclic group.

In one embodiment, ruthenium or osmium may form a metal center of the catalyst. In one embodiment, Ru or Os in the catalyst may be in the +2 oxidation state, may have an electron count of 16, and may be penta-coordinated. In an alternate embodiment, Ru or Os in the catalyst may be in the +2 oxidation state, may have an electron count of 18, and may be hexa-coordinated. A titanium-based ROMP catalyst may be used in some embodiments, possibly in addition to the Ru or Os based catalysts.

The catalyst may include one or more neutral electron-donating ligand, one or more anionic ligand, and an alkylidene radical as shown hereinabove in formula (XXII). A neutral electron-donating ligand, an anionic ligand or an alkylidene radical may be bonded to the metal center by coordination bond formation. As used herein, the term "neutral electron-donating ligand" refers to ligands that have a neutral charge when removed from the metal center. As used herein the term "alkylidene radical" refers to a substituted or unsubstituted divalent organic radical formed from an alkane by removal of two hydrogen atoms from the same carbon atom, the free valencies of which are part of a double bond. In one embodiment, a carbon atom in the alkylidene radical may form a double bond with the metal center in the metal complex. A carbon atom in the alkylidene radical may be substituted with R$^{12}$ and R$^{13}$, wherein R$^{12}$ and R$^{13}$ are as defined hereinabove.

An anionic ligand X in formula (XXII) may be a unidentate ligand or bidentate ligand. In one embodiment, X in formula (XXII) may be independently at each occurrence a halide, a carboxylate, a sulfonate, a sulfonyl, a sulfinyl, a diketonate, an alkoxide, an aryloxide, a cyclopentadienyl, a cyanide, a cyanate, a thiocyanate, an isocyanate, or an isothiocyanate. In one embodiment, X in formula (XXII) may be independently at each occurrence chloride, fluoride, bromide, iodide, CF$_3$CO$_2$, CH$_3$CO$_2$, CFH$_2$CO$_2$, (CH$_3$)$_3$CO, (CF$_3$)$_2$(CH$_3$)CO, (CF$_3$)(CH$_3$)$_2$CO, PhO, MeO, EtO, tosylate, mesylate, or trifluoromethanesulfonate.

The number of anionic ligands X bonded to the metal center may depend on one or more of the coordination state of the transition metal (for example, penta-coordinated or hexa-coordinated), the number of neutral electron donating ligands bonded to the transition metal, or dentency of the anionic ligand. In one embodiment, X in formula (XXII) may include a unidentate anionic ligand and "b" may be 2. In one embodiment, X in formula (XXII) may include a bidentate anionic ligand and "b" may be 1. In one embodiment, X in formula (XXII) may be independently at each occurrence a chloride and "b" may be 2.

In one embodiment, an electron donor ligand L in formula (XXII) may be independently at each occurrence a monodentate, a bidentate, a tridentate, or a tetradentate neutral electron donor ligand. In one embodiment, at least one L may be phosphine, phosphite, phosphinite, phosphonite, arsine, stibine, ether, amine, amide, imine, sulfoxide, carboxyl, nitrosyl, or thioethene. In one embodiment, at least one L may be a phosphine having formula P(R$^{14}$R$^{15}$R$^{16}$), where R$^{14}$, R$^{15}$, and R$^{16}$ are each independently an aliphatic radical, a cycloaliphatic radical, or an aromatic radical. In one embodiment, at least L may include P(cyclohexyl)$_3$, P(cyclopentyl)$_3$, P(isopropyl)$_3$, or P(phenyl)$_3$.

In one embodiment, at least one L may be a heterocyclic ligand. A heterocyclic ligand refers to an array of atoms forming a ring structure and including one or more heteroatoms as part of the ring, where heteroatoms are as defined hereinabove. A heterocyclic ligand may be aromatic (heteroarene ligand) or non-aromatic, wherein a non-aromatic heterocyclic ligand may be saturated or unsaturated. A heterocyclic ligand may be further fused to one or more cyclic ligand, which may be a heterocycle or a cyclic hydrocarbon, for example in indole.

In one embodiment, at least one L may be a heteroarene ligand. A heteroarene ligand refers to an unsaturated heterocyclic ligand in which the double bonds form an aromatic system. In one embodiment, at least one L is furan, thiophene, pyrrole, pyridine, bipyridine, picolylimine, gamma-pyran, gamma-thiopyran, phenanthroline, pyrimidine, bipyrimidine, pyrazine, indole, coumarone, thionaphthene, carbazole, dibenzofuran, dibenzothiophene, pyrazole, imidazole, benzimidazole, oxazole, thiazole, dithiazole, isoxazole, isothiazole, quinoline, bisquinoline, isoquinoline, bisisoquinoline, acridine, chromene, phenazine, phenoxazine, phenothiazine, triazine, thianthrene, purine, bisimidazole, or bisoxazole. In one embodiment, at least one L may be a monodentate heteroarene ligand, which may be unsubstituted or substituted, for example, pyridine. In one embodiment at least one L may be a bidentate heteroarene ligand, which may be substituted or unsubstituted, for example, bipyridine, phenanthroline, bithiazole, bipyrimidine, or picolylimine.

In one embodiment, at least one L may be a N-heterocyclic carbene ligand (NHC). A N-heterocyclic carbene ligand is a heterocyclic ligand including at least one N atom in the ring and a carbon atom having a free electron pair. Examples of NHC ligands may include ligands of formula (XXIII), (XXIV), or (XXV)

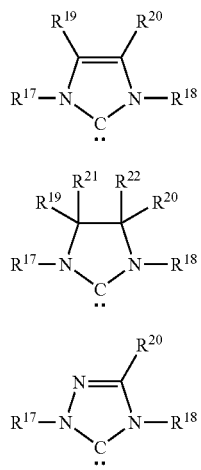

wherein $R^{17}$, $R^{18}$, $R^{19}$, $R^{20}$, $R^{21}$, or $R^{22}$ may be independently at each occurrence hydrogen, an aliphatic radical, a cycloaliphatic radical, or an aromatic radical. In one embodiment, $R^{19}$, $R^{20}$, $R^{21}$, and $R^{22}$ may be independently at each occurrence hydrogen. In one embodiment, $R^{17}$ and $R^{18}$ may be independently at each occurrence a substituted or an unsubstituted aromatic radical.

In one embodiment, a N-heterocyclic carbene ligand may include 1,3-dimesitylimidazolidin-2-ylidene; 1,3-di(1-adamantyl)imidazolidin-2-ylidene; 1-cyclohexyl-3-mesitylimidazolidin-2-ylidene; 1,3-dimesityl octahydro benzimidazol-2-ylidene; 1,3-diisopropyl-4-imidazolin-2-ylidene; 1,3-di(1-phenylethyl)-4-imidazolin-2-ylidene; 1,3-dimesityl-2,3-dihydrobenzimidazol-2-ylidene; 1,3,4-triphenyl-2,3,4,5-tetrahydro-1H-1,2,4-triazol-5-ylidene; 1,3-dicyclohexylhexahydro pyrimidin-2-ylidene; N,N,N',N'-tetraisopropyl formamidinylidene; 1,3,4-triphenyl-4,5-dihydro-1H-1,2,4-triazol-5-ylidene; or 3-(2,6-diisopropylphenyl)-2,3-dihydrothiazol-2-ylidene.

The number of neutral electron donor ligands L bonded to the transition metal may depend on one or more of the coordination state of the transition metal (for example, penta-coordinated or hexa-coordinated), the number of anionic ligands bonded to the transition metal, or dentency of the neutral electron donor ligand. In one embodiment, "a" in formula (XXII) may be 1. In one embodiment, "a" in formula (XXII) may be 2. In one embodiment, "a" in formula (XXII) may be 3. In one embodiment, $R^{12}$, $R^{13}$, X and L may be bound to one another in an arbitrary combination to form a multidentate chelate ligand. In one embodiment two or more of $R^{12}$, $R^{13}$, X or L may independently form a cyclic ring, for example, $R^{12}$ and $R^{13}$ may together form a substituted or unsubstituted indene group.

In one embodiment, at least one L in formula (XXII) may include a phosphine ligand. In one embodiment, at least one L in formula (XXII) may include P(cyclohexyl)$_3$, P(cyclopentyl)$_3$, P(isopropyl)$_3$, or P(phenyl)$_3$. In one embodiment, at least one L in formula (XXII) may include a monodentate pyridine ligand, which is unsubstituted or substituted. In one embodiment, at least one L in formula (XXII) may include a bromine-substituted monodentate pyridine ligand. In one embodiment, at least one L in formula (XXII) may include a N-heterocyclic carbene ligand (NHC). In one embodiment, at least one L in formula (XXII) may include an NHC ligands having formula (XXIII), (XXIV), or (XXV).

In one embodiment, $R^{13}$ in formula (XXII) may include an aromatic radical. In one embodiment, $R^{13}$ in formula (XXII) may include a substituted or an unsubstituted benzyl radical. In one embodiment, at least one X in formula (XXII) may include a halide. In one embodiment, at least one X in formula (XXII) be a chloride.

In one embodiment, the composition having a formula (XXII) may include Bis(tricyclohexylphosphine) benzylidine ruthenium (IV) chloride (CAS No. 172222-30-9), 1,3-Bis(2,4,6-trimethylphenyl)-2-imidazolidinylidene) dichloro (phenylmethylene) (tricyclohexylphosphine) ruthenium (CAS No. 246047-72-3), 1,3-Bis(2,4,6-trimethylphenyl)-2-imidazolidinylidene) dichloro(phenylmethylene) (di-3-bromopyridine) ruthenium, or 1,3-Bis-(2,4,6-trimethylphenyl)-2-imidazolidinylidene) dichloro(o-isopropoxyphenyl methylene) ruthenium (CAS No. 301224-40-8).

In one embodiment, the coupling agent composition is compatible with a metathesis catalyst capable of catalyzing a ring-opening metathesis polymerization reaction when contacted to a cycloolefin. As used herein the term compatible implies that the coupling agent composition does not react or interact with the metathesis catalyst in any way to poison the catalyst or affect the catalytic efficacy of the catalyst. In one embodiment, the catalytic efficacy may be described by the percentage conversion of the cycloolefin by the metathesis catalyst. A percentage conversion may be characterized by measuring the glass transition temperature of a cured cycloolefin using a method according to ASTM D4065.

The glass transition temperature of a cured cycloolefin prepared in the presence of the coupling agent composition may be the same as the glass transition temperature of a cured cycloolefin prepared in the absence of the coupling agent. In one embodiment, the glass transition temperature measured for a cured cycloolefin prepared in the presence of the coupling agent composition may be in a range of ±5 degrees Celsius of the glass transition temperature measured for a cured cycloolefin prepared in the absence of the coupling agent. The coupling agent composition may be selected to be compatible with the metathesis catalyst so as to not react or interact with the metathesis catalyst in any way to poison the catalyst or affect the catalytic efficacy of the catalyst.

In one embodiment, an anhydride group of the coupling agent composition is capable of covalent bond formation with the corresponding binding sites in the filler. In one embodiment, a binding site may include one or more of a hydroxyl group, an amine group, an epoxy group, an imide group, a carboxylic acid, an ester, or an amide group. In one embodiment, a filler may include a sizing composition. A sizing composition may include one or more of epoxy, urethane, polyvinyl alcohol, vinyl ester, polyester, or fatty acid ester.

In another embodiment, an anhydride of the coupling agent composition is capable of physical bond formation with the corresponding binding sites in the filler, for example by polar interactions or hydrogen bond formation. In one embodiment, a filler may include hydroxyl groups on the surface and the coupling agent composition may bond to the filler by hydrogen bond formation. The coupling agent composition may form both a covalent bond with the corresponding binding sites in the filler and another non-covalent bond.

As noted above, the curable composition may include a coupling agent composition, a polymer precursor, and a metathesis catalyst. A curable material may refer to a material having one or more reactive groups that may participate in a chemical reaction when exposed to one or more of thermal energy, electromagnetic radiation, or chemical reagents. Curing as used herein may refer to a reaction resulting in polymerization, cross-linking, or both polymerization and cross-linking of a curable material (for example, cycloolefin) having one or more reactive groups (for example, metathesis-active bonds in the cycloolefin).

The coupling agent composition may be present in an amount greater than about 0.1 weight percent based on the combined weight of the composition (coupling agent, polymer precursor and metathesis catalyst). In one embodiment, the coupling agent composition may be present in an amount in a range of from about 0.1 weight percent to about 0.5 weight percent, from about 0.5 weight percent to about 1 weight percent, from about 1 weight percent to about 5 weight percent, from about 5 weight percent to about 10 weight percent, from about 10 weight percent to about 25 weight percent, or from about 25 weight percent to about 50 weight percent of the combined weight of the composition. In one embodiment, the coupling agent composition may present in an amount that is greater than about 50 weight percent of the combined weight of the composition. The amount of the coupling agent present may be selected with reference to the amount of filler, the number of active sites on the filler, the application specific requirements, and other factors. Here and throughout the specification and clauses, range limitations may be combined and/or interchanged. Such ranges as identified include all the sub-ranges contained therein unless context or language indicates otherwise.

The polymer precursor may be present in an amount greater than about 0.5 weight percent based on the combined weight of the composition (coupling agent, polymer precursor and metathesis catalyst). In one embodiment, the polymer precursor composition may be present in an amount in a range of from about 0.5 weight percent to about 1 weight percent, from about 1 weight percent to about 5 weight percent, from about 5 weight percent to about 10 weight percent, from about 10 weight percent to about 25 weight percent, or from about 25 weight percent to about 50 weight percent of the combined weight of the composition. In one embodiment, a polymer precursor may be present in an amount that is greater than about 50 weight percent of the combined weight of the composition.

In embodiments involving mixtures of cycloolefins as polymer precursors, the combined weight of the polymer precursor may be in an amount in a range of from about 0.5 weight percent to about 50 weight percent of the combined weight of the composition (coupling agent, polymer precursor and metathesis catalyst).

The metathesis catalyst may be present in an amount greater than about 0.001 weight percent based on the combined weight of the composition (coupling agent, metathesis catalyst and metathesis catalyst). In one embodiment, the metathesis catalyst may be present in an amount in a range of from about 0.001 weight percent to about 0.01 weight percent, from about 0.01 weight percent to about 0.02 weight percent, from about 0.02 weight percent to about 0.03 weight percent, from about 0.03 weight percent to about 0.05 weight percent, or from about 0.05 weight percent to about 0.1 weight percent of the combined weight of the composition. In one embodiment, a metathesis catalyst may present in an amount that is greater than about 0.1 weight percent based on the combined weight of the composition.

The curable composition may include a reaction control agent. A reaction control agent may be added to control the pot life of the reaction mixture. In one embodiment, a reaction control agent may include a neutral electron donor or a neutral Lewis base. Suitable reaction control agents may include one or more of phosphines, sulfonated phosphines, phosphites, phosphinites, or phosphonites. Other suitable reaction control agents may include one or more of arsines, stibines, sulfoxides, carboxyls, ethers, thioethers, or thiophenes. Yet other suitable reaction control agents may include one or more of amines, amides, nitrosyls, pyridines, nitriles, or furans. In one embodiment, an electron donor or a Lewis base may include one or more functional groups, such as hydroxyl; thiol; ketone; aldehyde; ester; ether; amine; amide; nitro acid; carboxylic acid; disulfide; carbonate; carboalkoxy acid; isocyanate; carbodiimide; carboalkoxy; and halogen. In one embodiment, a reaction control agent may include one or more of triphenylphosphine, tricyclopentylphosphine, tricyclohexylphosphine, triphenylphosphite, pyridine, propylamine, tributylphosphine, benzonitrile, triphenylarsine, anhydrous acetonitrile, thiophene, or furan. In one embodiment, a reaction control agent may include one or more of $P(cyclohexyl)_3$, $P(cyclopentyl)_3$, $P(isopropyl)_3$, $P(Phenyl)_3$, or pyridine.

Optionally, the curable composition may include one or more additives. Suitable additives may be selected with reference to performance requirements for particular applications. For example, a fire retardant additive may be selected where fire retardancy may be desired, a flow modifier may be employed to affect rheology or thixotropy, a reinforcing filler may be added where reinforcement may be desired, and the like. The additives may include one or more of flow control agents, modifiers, carrier solvents, viscosity modifiers, adhesion promoters, ultra-violet absorbers, flame-retardants, or reinforcing fillers. Defoaming agents, dyes, pigments, and the like may also be incorporated into composition. The amount of such additives may be determined by the end-use application.

A melt viscosity of the curable composition may depend on one or more of the molecular weight of the polymer precursor, temperature, or percentage conversion of the polymer precursor. In one embodiment, the curable composition may have flow properties (for example viscosity) at a particular temperature such that the composition may flow into a cavity of a mold. A curable composition prepared according to one embodiment, of the invention may be solvent free. A solvent-free filled composition in accordance with one embodiment, of the invention may have sufficiently low viscosity such that the composition may flow into a cavity of a mold.

In one embodiment, a curable composition may have a room temperature viscosity in a range of less than about 200 centipoise. In one embodiment, a curable composition may have a room temperature viscosity in a range of from about 1 centipoise to about 10 centipoise, from about 10 centipoise to about 20 centipoise, from about 20 centipoise to about 50 centipoise, from about 50 centipoise to about 100 centipoise, from about 100 centipoise to about 150 centipoise, or from about 150 centipoise to about 200 centipoise. In one embodiment, a curable composition may have a room temperature viscosity essentially in a range of less than about 60 centipoise. In one embodiment, the curable composition may have a room temperature viscosity essentially in a range of less than about 20 centipoise.

Stability of the curable composition may also depend on one or more of temperature, ambient conditions, and the like. Stability or resin work life, as used herein in the specification and clauses, refers to a viscosity change for the curable composition that is less than 200 centipoise after a duration of time. In one embodiment, the curable composition may be stable at a temperature in a range of about 20 degrees Celsius for a period of greater than about 20 minutes. In one embodiment, the curable composition may be stable at a temperature in a range of from about 20 degrees Celsius to about 25 degrees Celsius, from about 25 degrees Celsius to about 30 degrees Celsius, from about 30 degrees Celsius to about 40 degrees Celsius, from about 40 degrees Celsius to about 50 degrees Celsius, or from about 50 degrees Celsius to about 60 degrees Celsius, and for a period of greater than about 10 minutes. In one embodiment, the curable composition may be stable at a temperature of about 20 degrees Celsius for a period of greater than about 1 hour. In one embodiment, the curable composition may be stable at a temperature in a range of greater than about 20 degrees Celsius for a period of greater than about 1 day. In one embodiment, the curable composition may have a resin work life of about 20 minutes at 20 degrees Celsius.

In one embodiment, a composition may include a reaction product of the curable composition including a coupling agent composition, a polymer precursor, and a metathesis catalyst. A reaction product may include one or more of a ring-opening polymerization reaction product of a first cycloolefin, a ring-opening polymerization reaction product of a second cycloolefin, a ring-opening polymerization reaction product of a first cycloolefin and a second cycloolefin, or a crosslinked reaction product of the first cycloolefin and the second cycloolefin. In one embodiment, a composition may include a cured reaction product of the curable composition. In one embodiment, a composition may include an unfilled cured reaction product of the curable composition.

In one embodiment, a metathesis catalyst may initiate a ring opening metathesis polymerization reaction when contacted to a first cycloolefin or a cycloolefin. In one embodiment, the conversion of the cycloolefin(s) may be complete, that is, the reaction product may be free of any unreacted cycloolefin(s). In one embodiment, the conversion of the cycloolefin(s) may be incomplete, that is, the reaction product may include unreacted cycloolefin(s). In one embodiment, the conversion of the cycloolefin(s) may be in a range that is greater than about 50 percent. In one embodiment, the conversion of the cycloolefin(s) may be in a range of from about 50 percent to about 60 percent, from about 60 percent to about 70 percent, from about 70 percent to about 80 percent, from about 80 percent to about 90 percent, or from about 90 percent to about 100 percent.

In one embodiment, a composition may include a filler and a curable composition having a coupling agent composition, a polymer precursor, and a metathesis catalyst. In some embodiments, a coupling agent composition may be disposed on a filler surface before addition of polymer precursor and metathesis catalyst. In other embodiments, a coupling agent composition may be mixed with a polymer precursor and a metathesis catalyst before contacting with the filler. In one embodiment, a composition may include a coupling agent composition bonded to one or more corresponding binding site on the filler, a polymer precursor, and a metathesis catalyst.

A suitable filler may include one or more material selected from siliceous materials, carbonaceous materials, metal hydrates, metal oxides, metal borides, or metal nitrides. In one embodiment, the filler essentially may include carbonaceous materials. The filler may be particulate, fibrous, platelet, whiskers or rods, or a combination of two or more of the foregoing.

The filler may include a plurality of particles. The plurality of particles may be characterized by one or more of average particle size, particle size distribution, average particle surface area, particle shape, or particle cross-sectional geometry.

In one embodiment, an average particle size (average diameter) of the filler may be less than about 1 nanometer. In one embodiment, an average particle size of the filler may be in a range of from about 1 nanometer to about 10 nanometers, from about 10 nanometers to about 25 nanometers, from about 25 nanometers to about 50 nanometers, from about 50 nanometers to about 75 nanometers, or from about 75 nanometers to about 100 nanometers. In one embodiment, an average particle size of the filler may be in a range of from about 0.1 micrometers to about 0.5 micrometers, from about 0.5 micrometers to about 1 micrometer, from about 1 micrometer to about 5 micrometers, from about 5 micrometers to about 10 micrometers, from about 10 micrometers to about 25 micrometers, or from about 25 micrometers to about 50 micrometers. In another embodiment, an average particle size of the filler may be in a range of from about 50 micrometers to about 100 micrometers, from about 100 micrometers to about 200 micrometers, from about 200 micrometers to about 400 micrometers, from about 400 micrometers to about 600 micrometers, from about 600 micrometers to about 800 micrometers, or from about 800 micrometers to about 1000 micrometers. In one embodiment, an average particle size of the filler may be in a range of greater than about 1000 micrometers.

In another embodiment, filler particles having two distinct size ranges (a bimodal distribution) may be included in the composition: the first range from about 1 nanometers to about 500 nanometers, and the second range from about 0.5 micrometer (or 500 nanometers) to about 1000 micrometers (the filler particles in the second size range may be herein termed "micrometer-sized fillers").

Filler particle morphology can be selected to include shapes and cross-sectional geometries based on the process used to produce the particles. In one embodiment, a filler particle may be a sphere, a rod, a tube, a flake, a fiber, a plate, a whisker, or be part of a plurality that includes combinations of two or more thereof. In one embodiment, a cross-sectional geometry of the particle may be one or more of circular, ellipsoidal, triangular, rectangular, or polygonal.

In one embodiment, the filler may be fibrous. A fibrous material may include one or more fibers and may be configured as a thread, a strand, yarn, a mat, a fabric, a woven roving, or a continuous filament. In one embodiment, a fibrous material may include one or more fiber having high strength. In one embodiment, a fibrous material may include continuous fibers. In one embodiment, a fibrous material may include discontinuous fibers. The strength of the fibers may be further increased by forming a plurality of layers or plies, by orientation of the fibers in a direction, and like methods.

With further reference to the material suitable to form the fibers, glass, ceramic, metal, and cermet are suitable. Suitable examples of glass fibers may include E-glass or S-glass fiber. Suitable examples of fibers may include, but are not limited to, glass fibers (for example, quartz, E-glass, S-2 glass, R-glass from suppliers such as PPG, AGY, St. Gobain, Owens-Corning, or from Johns Manville).

With regard to fibers that are carbonaceous, a suitable fiber may include a polymer. Suitable polymers may include one or more of polyester, polyamide (for example, NYLON polyamide available from E.I. DuPont, Wilmington, Del.), aromatic polyamide (such as KEVLAR aromatic polyamide available from E.I. DuPont; or P84 aromatic polyamide available from Lenzing Aktiengesellschaft, Austria), polyimide (for example, KAPTON polyimide available from E.I. DuPont), or polyolefins. Suitable polyolefins may include extended chain polyethylene (for example, SPECTRA polyethylene from Honeywell International Inc., Morristown, N.J.; or DYNEEMA polyethylene from Toyobo Co., Ltd., Tokyo, Japan), and the like.

Other suitable carbonaceous fibers may include carbon fiber. Suitable examples of carbon fibers may include, but are not limited to, AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M30S, M30G, and M40 from Toray Industries, Inc; HTS12K/24K, G30-500 3K/6K/12K, G30-500 12K, G30-700 12K, G30-700 24K F402, G40-800 24K, STS 24K, HTR 40 F22 24K 1550tex from Toho Tenax, Inc; 34-700, 34-700WD, 34-600, 34-600WD, and 34-600 unsized from Grafil Inc.; T-300, T-650/35, T-300C, and T-650/35C from Cytec Industries.

In one embodiment, the filler may include aggregates or agglomerates prior to incorporation into the composition, or after incorporation into the composition. An aggregate may include more than one filler particle in physical contact with one another, while an agglomerate may include more than one aggregate in physical contact with one another. In some embodiments, the filler particles may not be strongly agglomerated and/or aggregated such that the particles may be relatively easily dispersed in the polymeric matrix.

Optionally, the filler may be subjected to mechanical or chemical processes to improve the dispersibility of the filler in the polymer matrix. In one embodiment, the filler may be subjected to a mechanical process, for example, high shear mixing prior to dispersing in the polymer matrix. In one embodiment, the filler may be chemically treated prior to dispersing in the polymeric matrix.

Chemical treatment may include removing polar groups from one or more surfaces of the filler particles to reduce aggregate and/or agglomerate formation. Chemical treatment may also include functionalizing one or more surfaces of the filler particles with functional groups that may improve the compatibility between the fillers and the polymeric matrix, reduce aggregate and/or agglomerate formation, or both improve the compatibility between the fillers and the polymeric matrix and reduce aggregate and/or agglomerate formation. In some embodiments, chemical treatment may include applying a sizing composition to one or more surface of the filler particles.

The filler binding sites may include functional groups that may react or interact with the coupling agent composition to result in bond formation. As described hereinabove, in some embodiments, binding sites may be capable of covalent bond formation with the coupling agent composition. In other embodiments, binding sites may be capable of physical bond formation with the coupling agent composition, for example, van der Waals interactions or hydrogen bonding.

In one embodiment, suitable binding sites may be intrinsic to the filler, that is, present in the filler because of filler chemistry or processing steps involved in filler fabrication. In one embodiment, suitable binding sites may be included in the filler extrinsically, for example, by chemical treatment post-filler fabrication. In one embodiment, suitable binding sites in the filler may include both intrinsic and extrinsic functional groups. In one embodiment, a filler may include a sizing composition and the sizing composition may include one or more binding sites capable of bonding with the coupling agent composition. In one embodiment, suitable binding sites may include one or more of epoxy groups, amine groups, hydroxyl groups, or carboxylic groups.

In one embodiment, the filler may be present in an amount less than about 10 weight percent of the composition. In one embodiment, the filler may be present in amount in a range of from about 10 weight percent to about 20 weight percent, from about 20 weight percent to about 30 weight percent, from about 30 weight percent to about 40 weight percent, or from about 40 weight percent to about 50 weight percent based on the total weight of the composition. In another embodiment, the filler may be present in amount in a range of from about 50 weight percent to about 55 weight percent, from about 55 weight percent to about 65 weight percent, from about 65 weight percent to about 75 weight percent, from about 75 weight percent to about 95 weight percent, or from about 95 weight percent to about 99 weight percent. In one embodiment, the filler may be present essentially in amount in a range of from about 20 weight percent to about 40 weight percent of the composition. In one embodiment, the filler may be present essentially in amount in a range of from about 40 weight percent to about 80 weight percent of the composition.

An article, composite or laminate may be formed when the filler is a fibrous material that is impregnated with the curable composition. The article may be formed by placing the fibrous material in a mold. An intermediate for forming the article may be generated as a prepreg. The prepreg includes the curable composition and the filler. The curable composition includes the coupling agent composition, the polymer precursor, and the metathesis catalyst.

The article, or an intermediate, may include the reaction product of the filler and the curable composition. In one embodiment, the reaction product may include a partially cured reaction product of the curable composition and the filler. The partially cured reaction product may have sufficient structural integrity such that it can be removed from a mold. A percent conversion of the curable material in the partially cured reaction product may be less than about 50 percent. In one embodiment, the percent conversion of the curable material in the partially cured reaction product may be in a range of from about 50 percent to about 60 percent, from about 60 percent to about 70 percent, from about 70 percent to about 80 percent, from about 80 percent to about 90 percent, or from about 90 percent to about 95 percent. The degree of conversion may be based on processing requirements and throughput, the amount of green strength required, the need for additional processing steps prior to cure, the desire to add a chemically bondable coating, the acceptable amount of tack, and the like.

The partially cured reaction product may be cured further to form a fully cured composite structure. Fully cured does require a complete conversion of all convertible groups. A cured composite structure may have mechanical properties, thermal properties, or chemical properties to meet determined end-use requirements. In one embodiment, a cured resin in the composite structure may have a tensile modulus in a range of from about 250,000 pounds per square inch (psi) to about 300,000 pounds per square inch (psi), from about 300,000 pounds per square inch (psi) to about 400,000 pounds per square inch (psi), from about 400,000 pounds per square inch (psi) to about 500,000 pounds per square inch (psi), from about 500,000 pounds per square inch (psi) to about 600,000 pounds per square inch (psi), or from about 600,000 pounds per square inch (psi) to about 700,000 pounds per square inch (psi).

Compression strength for the composite structure may be measured using ASTM method D6641. In one embodiment, the composite structure may include a fibrous material and the fibers may be present in a direction parallel to the load during the test (0 degrees) and perpendicular to the load direction during the test (90 degrees direction). In one embodiment, a cured composite structure made with half the fibers in the 0 degree direction and half in the 90 degree direction may have a compression strength in a range of from about 30 kilo pounds per square inch (ksi) to about 40 kilo pounds per square inch (ksi), from about 40 kilo pounds per square inch (ksi) to about 50 kilo pounds per square inch (ksi), from about 50 kilo pounds per square inch (ksi) to about 60 kilo pounds per square inch (ksi), from about 60 kilo pounds per square inch (ksi) to about 70 kilo pounds per square inch (ksi), from about 70 kilo pounds per square inch (ksi) to about 80 kilo pounds per square inch (ksi), from about 80 kilo pounds per square inch (ksi) to about 90 kilo pounds per square inch (ksi), or from about 90 kilo pounds per square inch (ksi) to about 100 kilo pounds per square inch (ksi).

Toughness value for the composite structure may be measured using ASTM D5528-01 method for Mode I and an internally developed test using end-notch-flexure technique for Mode II. In one embodiment, the cured composite structure may have a toughness value in Mode I in a range of from about 2 pounds per inch to about 5 pounds per inch, from about 5 pounds per inch to about 10 pounds per inch, from about 10 pounds per inch to about 15 pounds per inch, or from about 15 pounds per inch to about 20 pounds per inch. In one embodiment, the cured composite structure may have a toughness value in Mode II in a range of from about 5 pounds per inch to about 10 pounds per inch, from about 10 pounds per inch to about 20 pounds per inch, from about 20 pounds per inch to about 30 pounds per inch, from about 30 pounds per inch to about 40 pounds per inch, or from about 40 pounds per inch to about 50 pounds per inch.

Glass transition temperature for the cured composite structure may be measured using ASTM method D4065. In one embodiment, the cured composite structure may have a glass transition temperature that is greater than about 120 degrees Celsius. In one embodiment, the cured composite structure may have a glass transition temperature that is greater than about 150 degrees Celsius. In one embodiment, the cured composite structure may have a glass transition temperature that is greater than about 175 degrees Celsius. In one embodiment, the cured composite structure may have a glass transition temperature in range of from 175 degrees to about 200 degrees Celsius.

The cured composite structure may be chemically resistant to a select group of corrosive materials. The cured composite structure may exhibit chemical resistance desired for the specific end-use. In one embodiment, chemical resistance may be defined as less than 15 percent reduction in compression strength after exposure to a solvent. Suitable solvents for this metric may include methyl ethyl ketone, hydraulic fluid, detergent, or engine fuel. Other corrosive materials may include oxidizers, acids, and bases.

In one embodiment, a method may include contacting the coupling agent composition with filler having binding sites. In one embodiment a method may include binding the coupling agent composition to the filler binding site. In one embodiment, binding may be initiated at room temperature. In one embodiment, binding may be initiated at a temperature in a range of from about 20 degrees Celsius to about 200 degrees Celsius. The coupling process, as used herein, differs from a sizing treatment or process in that the sizing is performed or applied during the production of the fibers. The coupling process, by contrast, is not applied during the fiber formation process.

In one embodiment, the coupling agent composition may be mixed in with the polymer precursor to form the curable composition. The curable composition may be then contacted with the filler. In one embodiment, a filler may include a fibrous material placed in a cavity of a mold. A curable material may be dispensed into the mold to impregnate the fibrous material.

In one embodiment, rather than mixing the coupling agent into the curable composition with the other ingredients, the coupling agent composition may be contacted with filler by coating the filler surface by dipping the fillers in a solution of the coupling agent composition or by spraying the fillers with a solution of the coupling agent composition. Solutions of coupling agent compositions if employed may include solvents having sufficiently volatility to allow for evaporation of the solvent. In one embodiment, a coupling agent composition may be contacted with the filler using solid-state deposition techniques. If aqueous coupling agents are desired to be used, the aqueous coupling agents can be emulsified to form a water in oil (WO) emulsion. Other emulsions, OW, WOW, and OWO emulsions may be used where appropriate.

The performance properties and characteristics of the article may differ depending on whether the coupling agent is mixed with the polymer precursor prior to impregnating the filler, or the coupling agent is applied to the filler before impregnation. Because some fibers come with sizing and other surface treatments, it may be necessary in some instances to burn off the sizing and to apply the coupling agent instead of the sizing.

To affect adhesion between resin matrix and fiber/filler, the fiber/filler surface can be reduced by contact with a strong reducing agent. Hydrazine is an example of a suitable reducing agent. Soaking the fibers in hydrogen peroxide affects the surface characteristics, and thus the adhesion of the matrix/fibers.

In one embodiment, a method may include heating the curable composition to a first temperature to form a partially cured reaction product, wherein partially cured reaction product is as defined hereinabove. In one embodiment, a curable composition may be heated to a first temperature in a range of from about 20 degrees Celsius to about 30 degrees Celsius, from about 30 degrees Celsius to about 40 degrees Celsius, from about 40 degrees Celsius to about 50 degrees Celsius, from about 50 degrees Celsius to about 60 degrees Celsius, or from about 60 degrees Celsius to about 75 degrees Celsius. In one embodiment, a curable composition may be heated to a first temperature that is in a range of about 60 degrees Celsius. In one embodiment, a curable composition may be heated to a first temperature for a sufficient duration of time such that a partially cured reaction product is formed.

In one embodiment, a partially cured reaction product may be further cured by heating the partially cured composition to a second temperature to form a cured composite structure. In one embodiment, a partially cured reaction product may be heated to a second temperature in a range of from about 75 degrees Celsius to about 100 degrees Celsius, from about 100 degrees Celsius to about 125 degrees Celsius, from about 125 degrees Celsius to about 150 degrees Celsius, from about 150 degrees Celsius to about 175 degrees Celsius, or from about 175 degrees Celsius to about 200 degrees Celsius. In one embodiment, a partially cured reaction product may be heated to a second temperature that is in a range of about 200 degrees Celsius. In one embodiment, a partially cured reaction product may be heated to a second temperature for a sufficient duration of time such that a cured composite structure is formed.

In one embodiment, a method may include binding the coupling agent to the filler binding sites. The binding of the coupling agent to the filler binding sites may be affected in the first curing step, the second curing step, or both the first curing step and the second curing steps.

Another method may include initiating a curing reaction of the polymer precursor. The curing reaction of the polymer precursor may include ring opening metathesis polymerization reaction of the first cycloolefin, the cycloolefin, or both the first cycloolefin and the cycloolefin. In one embodiment, a curing reaction may include one or more of double bond crosslinking or redistribution reaction.

A method may include curing the curable composition to form an article. In one embodiment, a method may include heating the curable composition to a first temperature to form a partially cured article. In one embodiment, a partially cured reaction product may be further cured by heating the partially cured composition to a second temperature to form a cured article. First curing temperature and the second curing temperature are as defined hereinabove.

An article may be fabricated from the curable composition into a desired shape or size by a molding technique. A suitable molding technique may include one or more of resin transfer molding (RTM), reaction injection molding (RIM), structural reaction injection molding (SRIM), vacuum-assisted resin transfer molding (VARTM), thermal expansion transfer molding (TERM), resin injection recirculation molding (RICM), controlled atmospheric pressure resin infusion (CAPRI) or Seeman's composite resin infusion molding (SCRIMP).

An article may be fabricated employing the compositions and methods described hereinabove. In one embodiment, the article that is provided includes the reaction product of the filler with the coupling agent composition, and coupling agent composition with the polymer precursor. The article fabricated employing the compositions and methods disclosed herein may have a thickness that is greater than about 0.1 millimeters. In one embodiment, the thickness may be in a range of from about 0.1 millimeters to about 0.5 millimeters, from about 0.5 millimeters to about 1 millimeter, from about 1 centimeter to about 5 centimeters, from about 5 centimeters to about 10 centimeters, or greater than about 10 centimeters. In one embodiment, the thickness may be greater than about 0.5 meters, and the length can be considerable.

In one embodiment, a laminate is provided. A laminate may include two or more layers. In one embodiment at least one layer may include a reaction product of a filler having binding sites and a curable composition including a coupling agent composition, a polymer precursor, and a metathesis catalyst. In one embodiment, the two or more layers may be bonded to each other. In one embodiment, a laminate may include at least one adhesive layer bonding the two or more layers.

EXAMPLES

The following examples only illustrate methods and embodiments in accordance with the invention, and do not impose limitations upon the clauses. Unless specified otherwise, all ingredients are commercially available from such common chemical suppliers as Alpha Aesar, Inc. (Ward Hill, Mass.), and Sigma-Aldrich Company (St. Louis, Mo.).

Example 1

Blending Coupling Agent Compositions with DCPD and Metathesis Catalyst

Anhydride-functionalized norbornene is commercially obtained and is employed as a coupling agent. The coupling agent is blended with degassed dicyclopentadiene at a temperature of 25 to 30 degrees Celsius using a magnetic stirrer. 1,3-Bis(2,4,6-trimethylphenyl)-2-imidazolidinylidene) dichloro (phenylmethylene) (tricyclohexyl phosphine) ruthenium (CAS No. 246047-72-3) dissolved in xylenes (~1:25) is added to the resin mixture in an amount of 0.075 weight percent just prior to infusion to yield formulation 1. Dicyclopentadiene is blended with the metathesis catalyst without coupling agent as described herein to form a Control Formulation.

Formulation 1 is used as the base to form Mixtures 1-5. Mixture 1 has 1 weight percent coupling agent, Mixture 2 has 2 weight percent coupling agent, Mixture 3 has 3 weight percent coupling agent, Mixture 4 has 4 weight percent coupling agent, and Mixture 5 has 5 weight percent coupling agent. The Control Formulation has no coupling agent.

Example 2

Preparation of DCPD/Carbon Fiber Composite Plaques

Mixtures 1-5 that are prepared in Example 1 are each infused into a stack of 8 inch×8 inch plies of T650-35 3K, 8HS fabric (from Cytech Engineered Materials) via a VARTM set-up. Infusion is completed in less than 10 minutes and is performed at room temperature under full vacuum.

The corresponding composite Plaques 1-5, and a control Plaque, are cured for 20 minutes at 70 degrees Celsius followed by debagging and a post-cure protocol. The post-cure protocol starts at 150 degrees Celsius and ramps up to 200 degrees Celsius over approximately 1.5 hours.

Compression strength of Plaques 1-5 and the Control Plaque is measured using ASTM method D6641. Plaques 1-5 show higher compression strength values when compared to the Control Plaque. FIG. 1 shows the effect on the final compression strength of adding various quantities of coupling agent to the composite formulation. The values shown in FIG. 1 are three-run averages, and are normalized to 60-volume percent filler concentration. The value for Plaque 4 may be low due to infusion difficulty.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In the following specification and the claims which follow, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity can not occur—this distinction is captured by the terms "may" and "may be".

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

The invention claimed is:

1. A composition, comprising:
   a coupling agent composition comprising a first cycloolefin substituted with at least one anhydride group;
   a filler having a corresponding binding site; and
   a polymer precursor comprising a second cycloolefin;
   wherein the coupling agent composition is capable of bonding to the filler having the corresponding binding site.

2. The composition as defined in claim 1, wherein the first cycloolefin comprises a structure having a formula (I), (II), or (III)

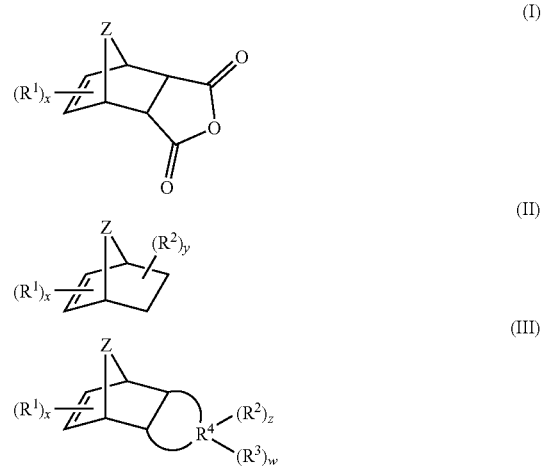

wherein "w" is 0, 1, 2 or 3, "x" is 0, 1, or 2, "y" is 1 or 2; "z" is 1, 2, 3, or 4;

$R^1$ and $R^3$ are independently at each occurrence a halogen atom, an aliphatic radical, a cycloaliphatic radical, an aromatic radical, an alkoxy group, a hydroxy group, an ether group, an aldehyde group, an ester group, a ketone group, a thiol group, a disulfide group, an amine group, an amide group, a quaternary amine group, an imine group, an isocyanate group, a carboxyl group, a silanyl group, a phosphanyl group, a sulfate group, a sulfonate group, a nitro group, or a divalent bond linking two carbon atoms;

$R^2$ comprises at least one anhydride group;

$R^4$ is an aliphatic cyclic ring, a heterocycle, or an aromatic group; and

Z is $C(R^5)_2$, $C=C(R^5)_2$, $Si(R^5)_2$, O, S, N—$R^5$, P—$R^5$, B—$R^5$, or As—$R^5$, wherein $R^5$ is independently at each occurrence hydrogen, an aliphatic radical, a cycloaliphatic radical, or an aromatic radical.

3. The composition as defined in claim 1, wherein the second cycloolefin comprises a structure having a formula (XIX):

wherein "v" is 1, 2, 3, 4, 5, or 6;

$R^8$ is independently at each occurrence a halogen atom, an aliphatic radical, a cycloaliphatic radical, an aromatic radical, an alkoxy group, a hydroxy group, an ether group, an aldehyde group, an ester group, a ketone group, a thiol group, a disulfide group, an amine group, an amide group, a quaternary amine group, an imine group, an isocyanate group, a carboxyl group, a silanyl group, a phosphanyl group, a sulfate group, a sulfonate group, a nitro group, or two or more $R^8$ together form a cycloaliphatic radical, an aromatic radical, an imide group, a cycloolefin group, or a divalent bond linking two carbon atoms; and Y is $C(R^9)_2$, $C=C(R^9)_2$, $Si(R^9)_2$, O, S, $NR^9$, $PR^9$, $BR^9$, or $AsR^9$, wherein $R^9$ is independently at each occurrence hydrogen, an aliphatic radical, a cycloaliphatic radical, or an aromatic radical.

4. The composition as defined in claim 1, wherein the second cycloolefin comprises one or more of dicyclopentadiene, norbornene, oxanorbornene, norbornadiene, cyclooctadiene, cyclooctene, cyclotetraene, cyclodecene, cyclododecene, or a derivative thereof.

5. The composition as defined in claim 1, further comprising a metathesis catalyst capable of catalyzing a ring-opening metathesis polymerization reaction when contacted to the first cycloolefin or the second cycloolefin.

6. The composition as defined in claim 5, wherein the metathesis catalyst comprises a structure having a formula (XXII):

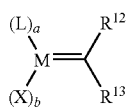

(XXII)

wherein "a" and "b" are independently integers from 1 to 3, with the proviso that "a+b" is less than or equal to 5;

M is ruthenium or osmium;

X is independently at each occurrence an anionic ligand;

L is independently at each occurrence a neutral electron donor ligand;

$R^{12}$ is hydrogen, an aliphatic radical, a cycloaliphatic radical, or an aromatic radical; and $R^{13}$ is an aliphatic radical, a cycloaliphatic radical, an aromatic radical, or S—$R^{14}$; or two or more of X, L, $R^{12}$ and $R^{13}$ independently form a cyclic group; and $R^{14}$ is an aliphatic radical, a cycloaliphatic radical, or an aromatic radical.

7. The composition as defined in claim 6, wherein the coupling agent composition is compatible with the metathesis catalyst.

8. The composition as defined in claim 1, wherein the coupling agent composition is present in an amount in a range of from about 0.5 weight percent to about 50 weight percent of the total weight of the composition.

9. The composition as defined in claim 1, wherein the coupling agent composition is capable of bonding to the filler-binding site by covalent bond formation.

10. The composition as defined in claim 1, wherein the filler comprises one or more material selected from the group consisting of siliceous materials, carbonaceous materials, metal hydrates, metal oxides, metal borides, and metal nitrides.

11. The composition as defined in claim 1, wherein the filler comprises a plurality of particles having a shape of a sphere, a rod, a tube, a flake, a plate, or a whisker, or the plurality comprises a combination of two or more of the foregoing shapes.

12. The composition as defined in claim 1, wherein the filler comprises a fibrous material.

13. The composition as defined in claim 12, wherein the fibrous material comprises a carbon fiber or a polymer fiber.

14. The composition as defined in claim 12, wherein the fibrous material comprises a glass fiber or a ceramic fiber.

15. The composition as defined in claim 1, wherein the filler is present in an amount in a range of from about 20 weight percent to 80 weight percent of the composition.

16. An article, comprising a reaction product of:
a coupling agent composition comprising a first cycloolefin substituted with at least one anhydride group;
a polymer precursor comprising a second cycloolefin;
a metathesis catalyst capable of catalyzing a ring-opening metathesis polymerization reaction when contacted to the first cycloolefin or to the second cycloolefin; and
a filler having binding sites capable of reacting with the coupling agent.

17. A cured composite structure comprising the article of claim 16.

18. A method, comprising:
contacting a coupling agent composition with a polymer precursor to form a curable composition; and
contacting the curable composition with a filler having binding sites to which the coupling agent composition can bond,
wherein the coupling agent composition comprises a first cycloolefin substituted with at least one anhydride group and the polymer precursor comprises a second cycloolefin.

19. The method as defined in claim 18, further comprising contacting the curable composition with a metathesis catalyst.

20. The method as defined in claim 18, further comprising curing the curable composition to form an article.

21. The method as defined in claim 18, further comprising covalently bonding the first cycloolefin to the filler.

* * * * *